United States Patent [19]

Fawcett

[11] Patent Number: 5,805,077
[45] Date of Patent: Sep. 8, 1998

[54] TWO-WAY PAGING SYSTEM HAVING REVERSE CHANNEL MESSAGE FREQUENCY AUTHENTICATION

[75] Inventor: Glenn S. Fawcett, Vancouver, Canada

[73] Assignee: Glenayre Electronics, Inc., Charlotte, N.C.

[21] Appl. No.: 722,375

[22] Filed: Sep. 30, 1996

[51] Int. Cl.⁶ ............................ G08B 5/22; H04Q 7/00
[52] U.S. Cl. .................... 340/825.44; 455/31.3
[58] Field of Search ............... 340/825.44; 455/31.3

[56] References Cited

U.S. PATENT DOCUMENTS

| | | | |
|---|---|---|---|
| 4,876,718 | 10/1989 | Citta et al. | 340/825.44 |
| 4,891,637 | 1/1990 | Siwiak et al. | 340/825.44 |
| 4,940,963 | 7/1990 | Gutman et al. | 340/825.44 |
| 5,124,697 | 6/1992 | Moore | 340/825.44 |
| 5,153,582 | 10/1992 | Davis | 340/825.44 |
| 5,162,790 | 11/1992 | Jasinski | 340/825.44 |
| 5,444,438 | 8/1995 | Goldberg | 340/825.44 |
| 5,459,458 | 10/1995 | Richardson et al. | 340/825.44 |
| 5,463,382 | 10/1995 | Nikas et al. | 340/825.44 |
| 5,475,863 | 12/1995 | Simpson et al. | 340/825.44 |
| 5,487,100 | 1/1996 | Kane | 340/825.44 |
| 5,542,115 | 7/1996 | Wong et al. | 455/31.3 |
| 5,561,848 | 10/1996 | Minami | 340/825.44 |
| 5,596,318 | 1/1997 | Mitchell | 340/825.44 |
| 5,600,703 | 2/1997 | Dang et al. | 455/31.3 |
| 5,625,885 | 4/1997 | Nakazawa | 340/825.44 |
| 5,630,207 | 5/1997 | Gitlin et al. | 340/825.44 |
| 5,631,635 | 5/1997 | Robertson et al. | 340/825.44 |
| 5,635,897 | 6/1997 | Kuo | 340/825.44 |
| 5,638,450 | 6/1997 | Robson | 340/825.44 |
| 5,663,715 | 9/1997 | Godoroia | 455/31.3 |

*Primary Examiner*—Michael Horabik
*Assistant Examiner*—Edward Merz
*Attorney, Agent, or Firm*—Christensen, O'Connor, Johnson & Kindness PLLC

[57] ABSTRACT

A method of modifying reverse channel messages in a two-way paging system (101) to authenticate reverse channel messages is disclosed. The intended frequency of the reverse channel message is converted into a unique binary integer. The binary integer is used to modify a checksum (207) in the reverse channel message so that the checksum is now dependent upon not only the message (205) contents but also the intended frequency of the reverse channel message. When received by a paging receiver (109) of the paging system, an identical calculation takes place and if the modified checksum transmitted with the reverse channel corresponds with the calculated checksum, the message is authenticated. Otherwise, the reverse channel message is rejected.

6 Claims, 2 Drawing Sheets

TWO-WAY PAGING SYSTEM HAVING REVERSE CHANNEL MESSAGE FREQUENCY AUTHENTICATION

FIELD OF THE INVENTION

The present invention relates to two-way paging systems, and more particularly, to a two-way paging system that requires reverse channel frequency authentication.

BACKGROUND OF THE INVENTION

A paging system typically might support millions of pagers using a network of thousands of paging transmitters in fixed locations nationwide. The paging transmitters are also supported by a control system and at least one paging terminal. The paging terminal operates to supply the pages to be broadcast to each of the paging transmitters. The combination of paging transmitters, control systems, and paging terminals, is collectively known as the paging infrastructure of the paging system. For modem two-way paging systems where the pagers can send as well as receive information, the paging infrastructure will also have a large number of paging receivers in fixed locations. The frequency band at which the pagers transmit to the paging system is referred to as the "reverse channel". Similarly, messages from the pagers to the paging system are referred to as "reverse channel messages".

In a two-way paging system, the paging infrastructure tracks the location of the pagers in order to deliver messages to the pagers using only a subset of the fixed-location transmitters, thus allowing reuse of the frequency in geographically separate locations. One prior art method of tracking pagers requires the pagers to transmit a registration message when the pager enters a new geographic "area". An "area" is specified by the paging system and indicated to the pagers by periodically broadcasted system wide informational messages.

The registration message, and indeed all reverse channel messages, are transmitted by the pager on a predefined or otherwise dictated frequency. However, the transmitters located in the pagers used to transmit the back channel messages, for reasons of economy, are generally spectrally imperfect. This results in reverse channel messages not only being transmitted in the desired frequency channel, but also in nearby frequency channels. These reverse channel messages in nearby frequency channels are referred to as "image" messages.

The receipt of image messages can result in system errors in third party paging systems that geographically overlap with the primary paging system. For example, an image registration message received by the third party paging system may cause the third party paging system to lose track of one of its pagers and send messages to the wrong area.

One prior art attempt of dealing with images is to transmit a channel identifier as part of the contents of the reverse channel message. The channel identifier indicates the frequency at which the pager has intended to transmit the reverse channel message. By comparing the channel identifier with the frequency upon which the reverse channel message was received, the paging system can determine if the reverse channel message is an image that should be rejected.

However, the drawback to this approach is that adding a channel identifier to the reverse channel message contents adds overhead to the message. Typically, channel bandwidth from the pagers to the paging system is a scarce and expensive resource.

The present invention solves these and other problems of the prior art.

SUMMARY OF THE INVENTION

A method of modifying reverse channel messages in a two-way paging system to authenticate reverse channel messages is disclosed. The intended frequency of the reverse channel message is converted into a unique binary integer. The binary integer is used to modify a checksum in the reverse channel message so that the checksum is now dependent upon not only the message contents but also the intended frequency of the reverse channel message. When received by a paging receiver of the paging system, an identical calculation takes place and if the modified checksum transmitted with the reverse channel corresponds with the calculated checksum, the message is authenticated. Otherwise, the reverse channel message is rejected.

In another aspect of the present invention, the checksum is calculated by means of a cyclic redundancy check. Further, the checksum is exclusively-ORed with the binary integer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
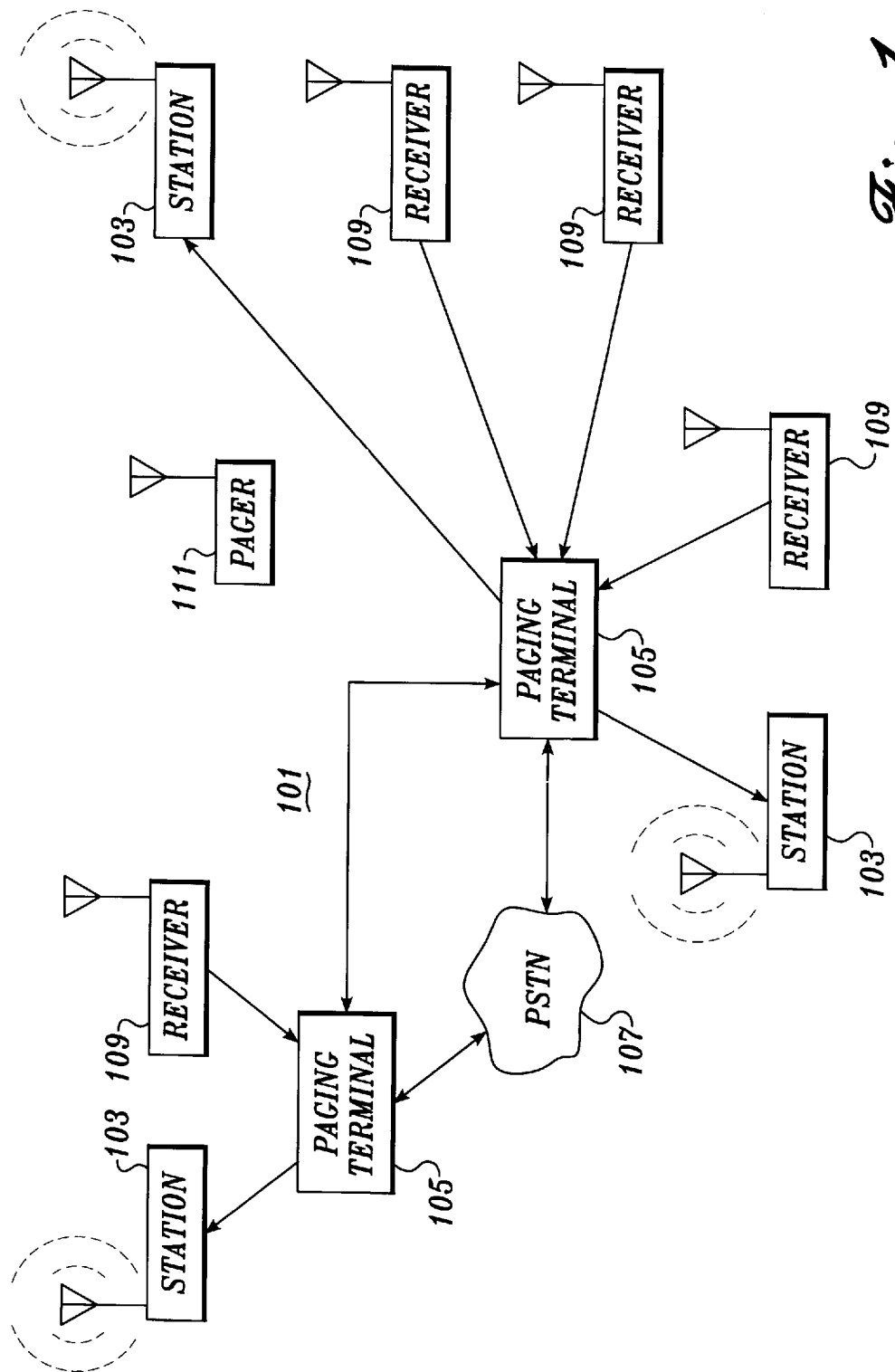
FIG. 1 is a schematic diagram of a typical paging system.

FIG. 1 shows a paging system 101 that includes paging stations 103, paging terminals 105, public switched telephone network (PSTN) 107, paging receivers 109 and pager 111. It can be appreciated by those skilled in the art that while only two paging terminals 105 are shown, a paging system may include many paging terminals. Likewise, the number of other components of the paging system 101 are merely illustrative. Indeed, paging systems can be grown or shrunk to meet consumer demand.

The paging stations 103 are also referred to as base stations or paging transmitters. In operation, callers who wish to page a subscriber use the PSTN 107 to call the subscriber's pager telephone number. Alternatively, pages can be originated through a computer network directly connected to a paging terminal. The call is routed, perhaps through a plurality of paging terminals, from the PSTN 107 to paging terminal 105 which formulates a page. The page is distributed over a communications network to each of the paging stations 103. The paging stations 103 in turn transmit the page throughout the geographic coverage area of the paging system 101.

The pager 111 receives the page and processes the message embedded within the page for display to the subscriber. In the case of a two-way paging system, the pager 111 broadcasts back to paging receivers 109 an acknowledgment signal that informs the paging terminal 105 that the page has been successfully received. The pager 111 may also initiate other types of messages that are unsolicited and are not acknowledgments for received messages. In any event, the signals transmitted by a pager to a paging system will be referred to as reverse channel messages.

Figure 2:
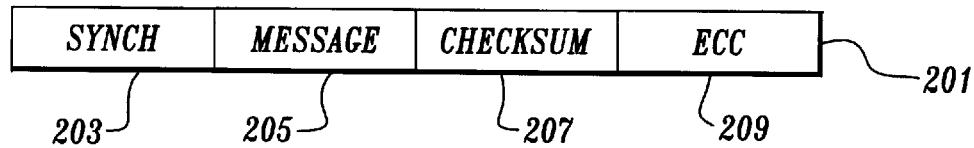
FIG. 2 is a schematic diagram of a reverse channel message.

Turning next to FIG. 2, a schematic illustration of a reverse channel message 201 is shown. The reverse channel message 201 includes a synch portion 203, a message portion 205, a checksum portion 207, and an ECC (error correcting code) portion 209.

Synch 203 is a synchronization signal or data pattern that assists the paging system in identifying the start of the reverse channel message and synchronizing itself to the data transitions. In the case of a paging system incorporating well synchronized clocks in both the pager 111 and paging receivers 109, the synch 203 may be abbreviated or eliminated completely.

The message 205 is the informational payload of the reverse channel message 201.

The checksum 207 is calculated numerically and is used, as can be appreciated by those skilled in the art, to verify the integrity of the reverse channel message. In one embodiment, the checksum is calculated using a Cyclic Redundancy Check (CRC). It can be appreciated that CRC is one of the most used techniques for error detection in data communications. In the preferred embodiment, the CRC polynomial is $X^{12}+X^{11}+X^3+X^2+X+1$. The use of such a polynomial generates a 12 bit CRC. Other commonly used polynomials may also be used, resulting in different length CRC words.

Finally, the ECC 209 is an optional error correcting code that is calculated from both the message 205 and the checksum 207. The ECC 209 allows errors introduced during transmission to be corrected. The preferred embodiment utilizes a Reed-Solomon code, but it can be appreciated that other methods such as message replication or interleaved Bose-Chaudhuri-Hocquenghem may be used.

Figure 3:
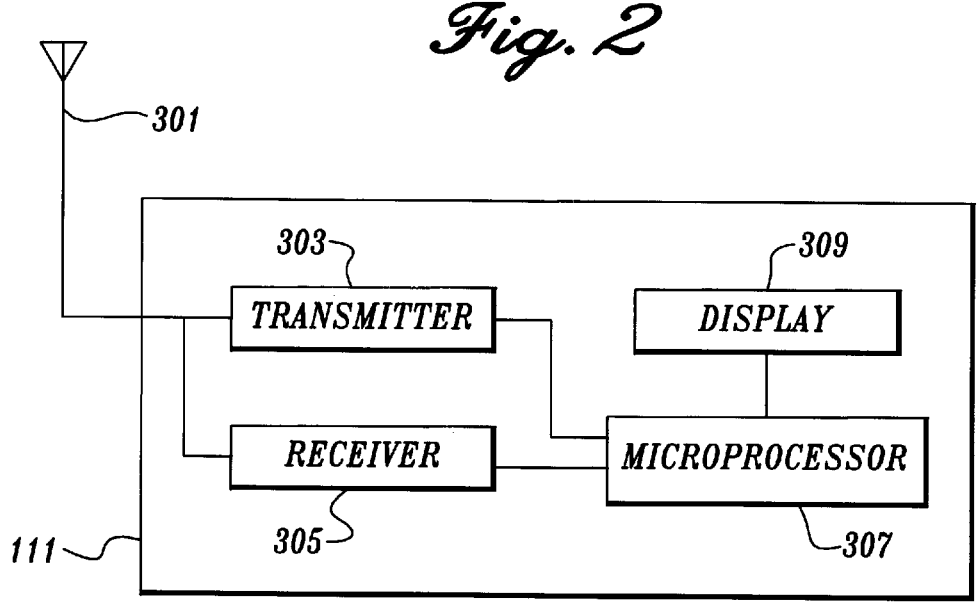
FIG. 3 is a schematic diagram of a two-way pager.

Turning next to FIG. 3, the two-way pager 111 is shown in detailed schematic form. The pager 111 includes an antenna 301, a transmitter 303, a receiver 305, a microprocessor 307, and a display 309. The transmitter 303 is activated by the microprocessor 307 to transmit through antenna 301 reverse channel messages. Messages from the paging system are also received through antenna 301 and routed to receiver 305 and then on for further processing to microprocessor 307. The display 309 may be a liquid crystal display and is used for displaying to the user of the pager 111 information received from the paging system. Other methods of presenting the received information, such as aurally through a speaker, are not precluded. Microprocessor 307 may be the Motorola 6805 microprocessor and is used to coordinate the operations of pager 111 in a manner well known in the art.

The present invention will now be described in conjunction with FIG. 4 which illustrates in flow diagram format the method of the present invention. In general, the checksum 207 is modified to be dependent upon the message 205 and upon the frequency upon which the reverse channel message will be transmitted. Thus, unlike the prior art, the frequency of the reverse channel is used to calculate the checksum 207. There are two steps in this process: (1) converting the reverse channel frequency into a binary integer of convenient size and (2) modifying the calculation of the checksum 207 using the binary integer.

Figure 4:
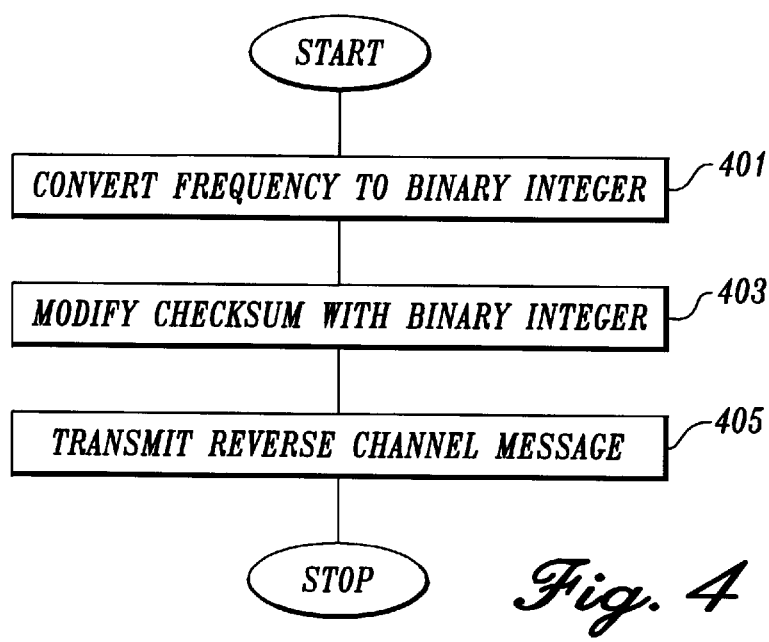
FIG. 4 is a flow diagram illustrating a preferred embodiment of the present invention.

Turning specifically now to FIG. 4, at box 401, the frequency at which the reverse channel message is to be transmitted is converted to a binary integer of a size less than or equal to that of the checksum 207. In this case, using a CRC with the polynomial specified above, the checksum 207 is 12 bits.

Many methods of conversion are possible and the description of the preferred embodiment herein should not be construed as limiting the scope of the claims. First, the lowest possible frequency of transmission is subtracted from the frequency of transmission of the reverse channel in hertz. In common paging systems, the lowest possible frequency of transmission may be, for example, 895,000,000 Hertz (for a "900 MHz" paging system). This frequency is subtracted from the frequency of transmission of the reverse channel message. The remainder is then divided by the width of the reverse channel in hertz. In typical paging systems, the width of the reverse channel may be 6,250 Hertz. The result is then converted into modulo 4,096, which results in a binary integer that may be represented in 12 bits and is different for nearby transmit frequencies.

The foregoing is but one example of a method of converting the frequency of the reverse channel message into a binary integer. Other methods are certainly possible with the goal being that the frequency of the reverse channel preferably converted into a binary integer that would be different for each of a wide range of different frequencies.

Next, at box 403, the checksum 207 is modified by the binary integer. As noted above, the checksum 207 can be generated using a Cyclic Redundancy Check over the message 205 using known techniques in the prior art. In the preferred embodiment, the checksum 207 is modified by exclusive-ORing with the binary integer calculated from the frequency of the reverse channel. The result is a modified checksum that is placed into the checksum slot 207 in the reverse channel message. Thus, it can be seen that the modified checksum 207 is now dependent upon the message 205 and the frequency of the reverse channel. The calculations detailed above can easily be performed by the microprocessor 307 when programmed with software in accordance with the present invention.

Several alternative methods for generating the modified checksum may also be used in place of the exclusive-OR operation. For example, the binary integer representing the frequency of the reverse channel can be temporarily prepended or appended to the message 205. The checksum 207 can then be calculated over the entire combination of message 205 and binary integer. In this manner, the checksum 207 is also dependent upon the frequency of the reverse channel. Alternatively, the checksum can be calculated based upon the message 205 and then the binary integer representing the frequency of the reverse channel may be added, subtracted, or multiplied with the checksum. The resulting modified checksum can then be placed into the reverse channel message for transmission.

Finally, at box 405, the reverse channel message 201 with the modified checksum is provided by microprocessor 307 to transmitter 303 for transmission via antenna 301.

Upon receipt by the paging receivers 109, an identical calculation as performed in the pager 111 is performed in the paging receivers 109. Note that the paging receivers 109 are specifically tuned to the appropriate and correct frequency of the reverse channel for that paging system. Thus, the paging receiver 109 converts the frequency of the reverse channel (as tuned to by the paging receiver 109) into a binary integer. The conversion is made using the same method as used in the pager 111.

A CRC is performed on the message 205 to determine a checksum 207. The CRC is exactly as done in the pager 111.

The checksum is exclusively-ORed, in the preferred embodiment, with the binary integer generated by the paging receivers 109 to generate a modified checksum. If the modified checksum as calculated by the paging receiver 109 (also referred to as an "authentication checksum") corresponds with the modified checksum 207 in the reverse channel message 201, then the reverse channel message 201 is authenticated and accepted. Otherwise, the reverse channel message is rejected.

In this manner, only reverse channel messages that are intended for receipt by the paging system will be accepted. This method also has the advantage over the prior art of not requiring additional data for overhead.

While the preferred embodiment has been illustrated and described, it will be apparent that various changes can be made therein without departing from the spirit and scope of the invention.

The embodiments of the invention in which an exclusive property or privilege is claimed are defined as follows:

1. A two-way paging system comprising:
   (a) at least one two-way pager operative to formulate a reverse channel message for transmission on a reverse channel frequency, said reverse channel message including at least a message portion and a checksum portion, said chechsum portion dependent upon said message portion and said reverse channel frequency in a predetermined manner;
   (b) a plurality of paging receivers for receiving said reverse channel message transmitted by said pager, said paging receivers calculating an authentication checksum based upon said message portion and said reverse channel frequency in said predetermined manner, said paging receivers rejecting said reverse channel message unless said authentication checksum matches said checksum portion in said reverse channel message.

2. The two-way paging system of claim 1 wherein said predetermined manner is:
   (a) performing a cyclic redundancy check (CRC) on said message portion to generate a CRC word;
   (b) converting said reverse channel frequency into a binary integer less than or equal in size to said CRC word;
   (c) exclusively-ORing said binary integer with said CRC word to generate a modified checksum; and
   (d) using said modified checksum as said checksum portion in said reverse channel message.

3. A two-way pager including:
   (a) a receiver for receiving messages transmitted by a two-way paging system;
   (b) a transmitter for transmitting reverse channel messages to said two-way paging system on a reverse channel frequency;
   (c) a microprocessor connected to said receiver and said transmitter, said microprocessor operative to formulate said reverse channel message for transmission on said reverse channel frequency, said reverse channel message including at least a message portion and a checksum portion, said checksum portion dependent upon said message portion and said reverse channel frequency in a predetermined manner.

4. The pager of claim 3 further wherein said microprocessor generates said checksum portion by:
   (a) performing a cyclic redundancy check (CRC) on said message portion to generate a CRC word;
   (b) converting said reverse channel frequency into a binary integer less than or equal in size to said CRC word;
   (c) exclusively-ORing said binary integer with said CRC word to generate a modified checksum; and
   (d) using said modified checksum as said checksum portion in said reverse channel message.

5. A method for authenticating a reverse channel message transmitted by a two-way pager on a reverse channel frequency in a two-way paging system, said method comprising the steps of:
   (a) formulating said reverse channel message for transmission by said two-way pager, said reverse channel message including at least a message portion and a checksum portion, said checksum portion dependent upon said message portion and said reverse channel frequency in a predetermined manner;
   (b) receiving said reverse channel message by said two-way paging system, said two-way paging system calculating an authentication checksum based upon said message portion and said reverse channel frequency in said predetermined manner, said two-way paging system rejecting said reverse channel message unless said authentication checksum matches said checksum portion in said reverse channel message.

6. The method of claim 3 further wherein said step of generating said predetermined manner includes the steps of:
   (a) performing a cyclic redundancy check (CRC) on said message portion to generate a CRC word;
   (b) converting said reverse channel frequency into a binary integer less than or equal in size to said CRC word;
   (c) exclusively-ORing said binary integer with said CRC word to generate a modified checksum; and
   (d) using said modified checksum as said checksum portion in said reverse channel message.

* * * * *